United States Patent
Brighenti et al.

(10) Patent No.: US 11,212,759 B2
(45) Date of Patent: Dec. 28, 2021

(54) DISTRIBUTED ANTENNA SYSTEM AND C-RAN SYSTEM UTILIZING SMART DETECTION OF SURROUNDING ENVIRONMENT

(71) Applicant: CommScope Technologies LLC, Hickory, NC (US)

(72) Inventors: Samuele Brighenti, Faenza (IT); Laura Macrelli, Cesena (IT); Marianna Fabbri, Faenza (IT)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/805,279

(22) Filed: Feb. 28, 2020

(65) Prior Publication Data

US 2020/0305096 A1 Sep. 24, 2020

Related U.S. Application Data

(60) Provisional application No. 62/822,459, filed on Mar. 22, 2019.

(51) Int. Cl.
*H04W 52/52* (2009.01)
*G01S 13/89* (2006.01)
(Continued)

(52) U.S. Cl.
CPC .............. *H04W 52/52* (2013.01); *G01S 13/89* (2013.01); *H04W 52/34* (2013.01); *H04W 88/085* (2013.01)

(58) Field of Classification Search
CPC ...... H04W 4/029; H04W 52/52; H04W 88/08
See application file for complete search history.

(56) References Cited

U.S. PATENT DOCUMENTS

2012/0270536 A1 10/2012 Ratasuk et al.
2015/0282069 A1* 10/2015 Hobbs ................. H04L 41/0833
370/252
(Continued)

OTHER PUBLICATIONS

International Searching Authority, "International Search Report and Written Opinion from PCT Application No. PCT/US2020/020463", from Foreign Counterpart to U.S. Appl. No. 16/805,279, dated Jun. 22, 2020, pp. 1 through 9, Published: WO.
(Continued)

*Primary Examiner* — Tu X Nguyen
(74) *Attorney, Agent, or Firm* — Fogg & Powers LLC (57) ABSTRACT

In one example, a system comprises a central unit and a radiating point located remotely from the central unit and communicatively coupled to the central unit. The radiating point is configured to provide radio frequency signals to a coverage zone via one or more antennas. The system further comprises a radar sensor communicatively coupled to the radiating point and configured to capture image data in the coverage zone of the radiating point, wherein the radar sensor includes a plurality of transmitters and receivers coupled to an antenna array. One or more components of the system are configured to determine user detection data for users in the coverage zone based on the image data captured by the radar sensor and adjust the power consumption of the radiating point based on the user detection data.

19 Claims, 5 Drawing Sheets (51) Int. Cl.
*H04W 52/34* (2009.01)
*H04W 88/08* (2009.01)

(56) References Cited

U.S. PATENT DOCUMENTS

| | | | |
|---|---|---|---|
| 2016/0034823 A1 | 2/2016 | Farkas et al. | |
| 2016/0270006 A1 | 9/2016 | Choi et al. | |
| 2017/0328997 A1* | 11/2017 | Silverstein | G01S 13/87 |
| 2018/0167927 A1 | 6/2018 | Beattie, Jr. et al. | |
| 2020/0271771 A1* | 8/2020 | Melamed | G01B 15/04 |

OTHER PUBLICATIONS

Utkovski et al., "Random Access in C-RAN for User Activity Detection With Limited-Capacity Fronthaul", IEEE Signaling Processing Letters, Dec. 1, 2016, pp. 17-21, vol. 24, Issue 1, IEEE.

\* cited by examiner

DISTRIBUTED ANTENNA SYSTEM AND C-RAN SYSTEM UTILIZING SMART DETECTION OF SURROUNDING ENVIRONMENT

CROSS-REFERENCE TO RELATED APPLICATIONS

This application claims the benefit of U.S. Provisional Application Ser. No. 62/822,459, filed Mar. 22, 2019, and titled "DISTRIBUTED ANTENNA SYSTEM AND C-RAN SYSTEM UTILIZING SMART DETECTION OF SURROUNDING ENVIRONMENT," which is hereby incorporated herein by reference.

BACKGROUND

Typical radio frequency distribution systems, such as distributed antenna systems or cloud radio access network (C-RAN) systems, are not aware of the distribution patterns of users for respective radiating points (for example, remote antenna units, radio points, access points, or the like) in the system. These systems allocate coverage using a central unit (for example, master unit, controller, or the like) in an inefficient manner that leads to excessive power consumption by the radiating points and ineffective coverage plans. A deployment of such a system with multiple active radiating points may also have further inefficiencies due to the real-world attenuation in an indoor scenario and overlapping coverage areas for radiating points. Systems without the capability to address these issues cause considerable time and expense for the installation team and higher operational and capital expenditure for the system operator.

SUMMARY

In one example, a system comprises a central unit and a radiating point located remotely from the central unit and communicatively coupled to the central unit. The radiating point is configured to provide radio frequency signals to a coverage zone via one or more antennas. The system further comprises a radar sensor communicatively coupled to the radiating point and configured to capture image data in the coverage zone of the radiating point, wherein the radar sensor includes a plurality of transmitters and receivers coupled to an antenna array. One or more components of the system are configured to determine user detection data for users in the coverage zone based on the image data captured by the radar sensor and adjust the power consumption of the radiating point based on the user detection data.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Distributed Antenna System Implementation

Figure 1:
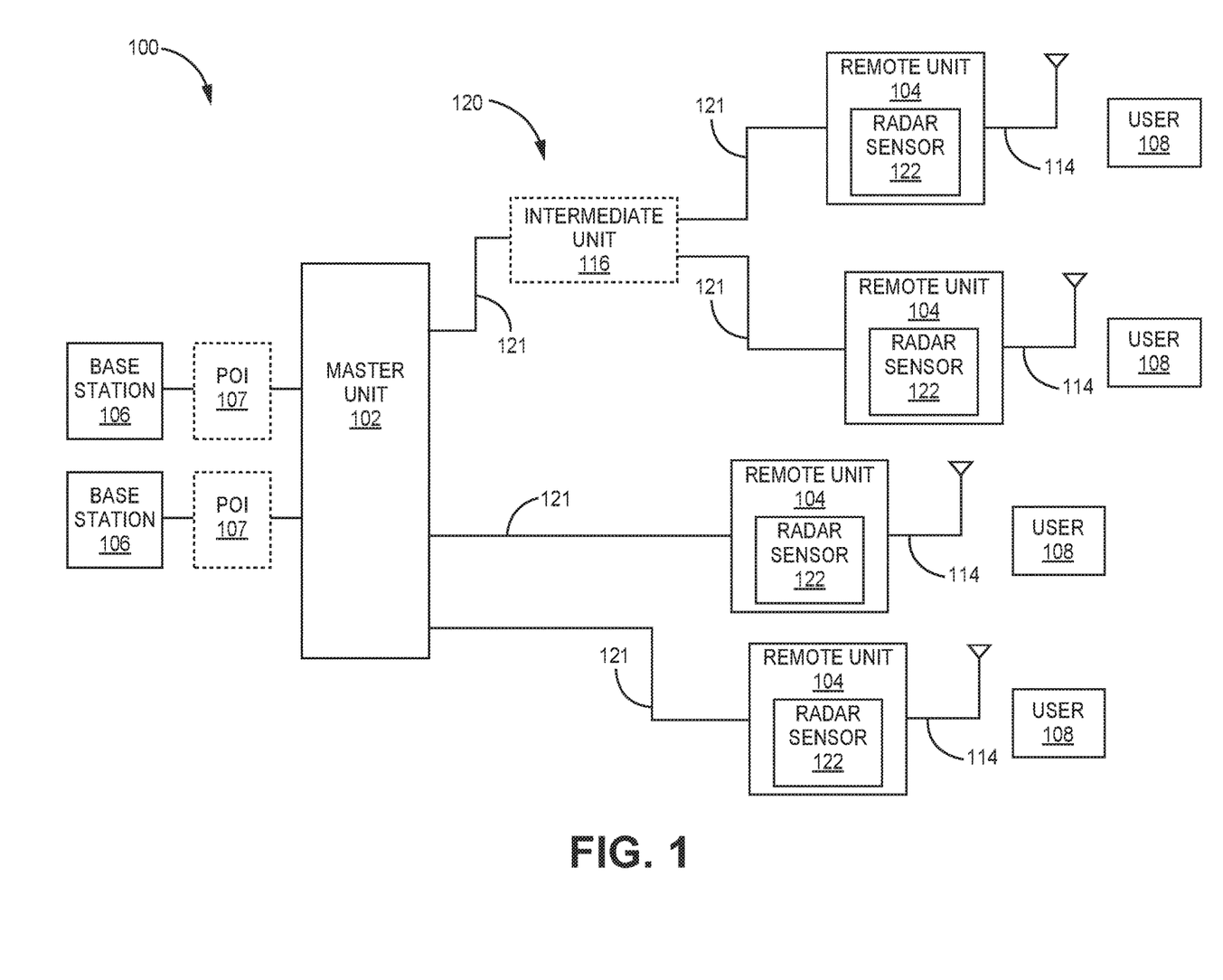
FIG. 1 is a block diagram of an example distributed antenna system.

FIG. 1 is a block diagram of an example distributed antenna system (DAS) 100. In the example of FIG. 1, the DAS 100 includes one or more master units 102 (also referred to as "host units" or "central area nodes" or "central units") and one or more remote antenna units 104 (also referred to as "remote units" or "radiating points") that are communicatively coupled to the one or more master units 102. In this example, the DAS 100 comprises a digital DAS, in which DAS traffic is distributed between the master units 102 and the remote antenna units 104 in digital form. The DAS 100 can be deployed at a site to provide wireless coverage and capacity for one or more wireless network operators. The site may be, for example, a building or campus or other grouping of buildings (used, for example, by one or more businesses, governments, or other enterprise entities) or some other public venue (such as a hotel, resort, amusement park, hospital, shopping center, airport, university campus, arena, or an outdoor area such as a ski area, stadium or a densely-populated downtown area).

The master unit 102 is communicatively coupled to one or more base stations 106. One or more of the base stations 106 can be co-located with the respective master unit 102 to which it is coupled (for example, where the base station 106 is dedicated to providing base station capacity to the DAS). Also, one or more of the base stations 106 can be located remotely from the respective master unit 102 to which it is coupled (for example, where the base station 106 is a macro base station providing base station capacity to a macro cell in addition to providing capacity to the DAS). In this latter case, a master unit 102 can be coupled to a donor antenna in order to wirelessly communicate with the remotely located base station 106.

The base stations 106 can be implemented as a traditional monolithic base station. Also, the base stations 106 can be implemented using a distributed base station architecture in which a base band unit (BBU) is coupled to one or more remote radio heads (RRHs), where the front haul between the BBU and the RRH uses streams of digital IQ samples. Examples of such an approach are described in the Common Public Radio Interface (CPRI) and Open Base Station Architecture Initiative (OBSAI) families of specifications.

The master unit 102 can be configured to use wideband interfaces or narrowband interfaces to the base stations 106. Also, the master unit 102 can be configured to interface with the base stations 106 using analog radio frequency (RF) interfaces or digital interfaces (for example, using a CPRI or OBSAI digital IQ interface). In some examples, the master unit 102 interfaces with the base stations 106 via one or more wireless interface nodes (not shown). A wireless interface node can be located, for example, at a base station hotel, and group a particular part of a RF installation to transfer to the master unit 102.

Traditionally, a master unit 102 interfaces with one or more base stations 106 using the analog radio frequency signals that each base station 106 communicates to and from a mobile device (also referred to as "mobile units" or "user equipment") of a user 108 using a suitable air interface standard. The DAS operates as a distributed repeater for such radio frequency signals. RF signals transmitted from each base station 106 (also referred to herein as "downlink RF signals") are received at the master unit 102. In such examples, the master unit 102 uses the downlink RF signals to generate a downlink transport signal that is distributed to one or more of the remote antenna units 104. Each such remote antenna unit 104 receives the downlink transport signal and reconstructs a version of the downlink RF signals based on the downlink transport signal and causes the reconstructed downlink RF signals to be radiated from at least one antenna 114 coupled to or included in that remote antenna unit 104.

A similar process can be performed in the uplink direction. RF signals transmitted from mobile units (also referred to herein as "uplink RF signals") are received at one or more remote antenna units 104. Each remote antenna unit 104 uses the uplink RF signals to generate an uplink transport signal that is transmitted from the remote antenna unit 104 to a master unit 102. The master unit 102 receives uplink transport signals transmitted from one or more remote antenna units 104 coupled to it. The master unit 102 combines data or signals communicated via the uplink transport signals received at the master unit 102 and can reconstruct a version of the uplink RF signals received at the remote antenna units 104. In such examples, the master unit 102 communicates the reconstructed uplink RF signals to one or more base stations 106. In this way, the coverage of the base stations 106 can be expanded using the DAS.

As noted above, in the example shown in FIG. 1, the DAS is implemented as a digital DAS. In a "digital" DAS, signals received from and provided to the base stations 106 and mobile devices of a user 108 are used to produce digital in-phase (I) and quadrature (Q) samples, which are communicated between the master unit 102 and remote antenna units 104. It is important to note that this digital IQ representation of the original signals received from the base stations 106 and from the mobile devices of users 108 still maintains the original modulation (that is, the change in the amplitude, phase, or frequency of a carrier) used to convey telephony or data information pursuant to the cellular air interface protocol used for wirelessly communicating between the base stations 106 and the mobile devices of users 108. Examples of such cellular air interface protocols include, for example, the Global System for Mobile Communication (GSM), Universal Mobile Telecommunications System (UMTS), High-Speed Downlink Packet Access (HSDPA), Long-Term Evolution (LTE), and Fifth Generation (5G) air interface protocols. Also, each stream of digital IQ samples represents or includes a portion of wireless spectrum. For example, the digital IQ samples can represent a single radio access network carrier (for example, a UMTS or LTE carrier of 5 MHz) onto which voice or data information has been modulated using a UMTS or LTE air interface. However, it is to be understood that each such stream can also represent multiple carriers (for example, in a band of frequency spectrum or a sub-band of a given band of frequency spectrum).

In the example shown in FIG. 1, the master unit 102 can be configured to interface with one or more base stations 106 using an analog RF interface (for example, either a traditional monolithic base station or via the analog RF interface of an RRH). The base stations 106 can be coupled to the master unit 102 using a network of attenuators, combiners, splitters, amplifiers, filters, cross-connects, etc., which is referred to collectively as a point-of-interface (POI) 107. This is done so that, in the downstream, the desired set of RF carriers output by the base stations 106 can be extracted, combined, and routed to the appropriate master unit 102, and so that, in the upstream, the desired set of carriers output by the master unit 102 can be extracted, combined, and routed to the appropriate interface of each base station 106.

In the example shown in FIG. 1, in the downstream, the master unit 102 can produce digital IQ samples from an analog wireless signal received at radio frequency (RF) by down-converting the received signal to an intermediate frequency (IF) or to baseband, digitizing the down-converted signal to produce real digital samples, and digitally down-converting the real digital samples to produce digital in-phase (I) and quadrature (Q) samples. These digital IQ samples can also be filtered, amplified, attenuated, and/or re-sampled or decimated to a lower sample rate. The digital samples can be produced in other ways. Each stream of digital IQ samples represents a portion of wireless radio frequency spectrum output by one or more base stations 106. Each portion of wireless radio frequency spectrum can include, for example, a band of wireless spectrum, a sub-band of a given band of wireless spectrum, or an individual wireless carrier.

Likewise, in the upstream, the master unit 102 can produce an upstream analog wireless signal from one or more streams of digital IQ samples received from one or more remote antenna units 104 by digitally combining streams of digital IQ samples that represent the same carriers or frequency bands or sub-bands (for example, by digitally summing such digital IQ samples), digitally up-converting the combined digital IQ samples to produce real digital samples, performing a digital-to-analog process on the real samples in order to produce an IF or baseband analog signal, and up-converting the IF or baseband analog signal to the desired RF frequency. The digital IQ samples can also be filtered, amplified, attenuated, and/or re-sampled or interpolated to a higher sample rate, before and/or after being combined. The analog signal can be produced in other ways (for example, where the digital IQ samples are provided to a quadrature digital-to-analog converter that directly produces the analog IF or baseband signal).

In the example shown in FIG. 1, the master unit 102 can be configured to interface with one or more base stations 106 using a digital interface (in addition to, or instead of) interfacing with one or more base stations 106 via an analog RF interface. For example, the master unit 102 can be configured to interact directly with one or more BBUs using the digital IQ interface that is used for communicating between the BBUs and an RRHs (for example, using the CPRI serial digital IQ interface).

In the downstream, the master unit 102 terminates one or more downstream streams of digital IQ samples provided to it from one or more BBUs and, if necessary, converts (by re-sampling, synchronizing, combining, separating, gain adjusting, etc.) them into downstream streams of digital IQ samples compatible with the remote antenna units 104 used in the DAS. In the upstream, the master unit 102 receives upstream streams of digital IQ samples from one or more remote antenna units 104, digitally combining streams of digital IQ samples that represent the same carriers or frequency bands or sub-bands (for example, by digitally summing such digital IQ samples), and, if necessary, converts (by re-sampling, synchronizing, combining, separating, gain adjusting, etc.) them into upstream streams of digital IQ samples compatible with the one or more BBUs that are coupled to that master unit 102.

In the downstream, each remote antenna unit 104 receives streams of digital IQ samples from the master unit 102, where each stream of digital IQ samples represents a portion of wireless radio frequency spectrum output by one or more base stations 106.

In some aspects, the master unit 102 is directly coupled to the remote antenna units 104. In such aspects, the master unit 102 is coupled to the remote antenna units 104 using a communication medium 121. For example, the communication medium 121 can include optical fiber or Ethernet cable complying with the Category 5, Category 5e, Category 6, Category 6A, or Category 7 specifications. Future communication medium specifications used for Ethernet signals are also within the scope of the present disclosure.

In some aspects, one or more intermediate units 116 (also referred to as "expansion units" or "transport expansion nodes") can be placed between the master unit 102 and one or more of the remote antenna units 104. This can be done, for example, in order to increase the number of remote antenna units 104 that a single master unit 102 can feed, to increase the master-unit-to-remote-antenna-unit distance, and/or to reduce the amount of cabling needed to couple a master unit 102 to its associated remote antenna units 104. The expansion units 116 are coupled to the master unit 102 via one or more communication links 121. In some examples, the communication links include optical communication links or other wired communication medium.

In the example shown in FIG. 1, the DAS 100 further includes radar sensors 122 in the remote antenna units 104 to provide real-time user detection data, which can include the number of users and the location of the users 108 in the coverage area of the remote antenna units 104. The DAS 100 is configured to adjust the power consumption of the remote antenna units 104 and/or allocate capacity to the remote antenna units 104 based on the user detection data. In some examples, one or more components of the DAS 100 are configured to adjust power consumption by activating or deactivating power amplifiers of the remote antenna units 104 based on the user detection data. In some examples, Internet of Things (IoT) bands and digital/RF components in the remote antenna units 104 that require long power cycle time remain active, which can be advantageous in order to quickly react to the presence requirements. In some examples, one or more components of the DAS 100 are further configured to adjust power consumption by adjusting the speed of internal fans of the remote antenna units 104 and/or the transmission power level of the remote antenna units 104. In some examples, the master unit 102 includes a database to store the user detection data, which can be accessed by emergency crews or by the system operator for other purposes than power management or capacity allocation.

The radar sensor 122 can be integrated with the remote antenna unit 104, which could include, for example, mounting the radar sensor 122 inside the housing of the remote antenna unit 104. In other examples, the radar sensor 122 is mounted near the remote antenna unit 104 but not within the same housing. It should be understood that the DAS 100 can include a subset of remote antenna units 104 with an integrated radar sensor 122 and another subset of remote antenna units 104 where the radar sensor 122 is mounted near the respective remote antenna unit 104. The radar sensors 122 can be powered internally or externally by the remote antenna units 104 or another source of power.

The radar sensors 122 are configured to transceive radio frequency signals at a plurality of frequencies via an array of antennas. In some examples, the radar sensor 122 includes a plurality of transmitters and receivers coupled to the array of antennas. The radar sensor 122 processes the signals received via the array of antennas and is configured to generate three-dimensional (3D) image data regarding the environment surrounding the radar sensor 122. In some examples, the radar sensor 122 includes a digital signal processor configured to process the image data to determine a number of users 108 and/or location of users 108 in the coverage area. In this context, the term "users" refers to an individual (for example, a human) rather than wireless users specifically. One example of such radar sensors 122 includes the family of 3D imaging sensors that are commercially available from Vayyar Imaging Ltd. In some examples, the radar sensor 122 is configured to use different operating frequency bands than the operating frequency bands of the remote antenna unit. In some examples, the operating frequency bands for the remote antenna unit range from approximately 380 MHz to 3.8 GHz. In such examples, the radar sensor 122 can be configured to operate in frequency bands ranging above 4 GHz. For example, the radar sensor 122 can be configured to operate in frequency bands ranging from approximately 4 GHz to 81 GHz. It should be understood that the radar sensor 122 can be configured to modify the operating frequency bands in order to avoid interfering with the remote antenna unit 104. For example, the operating frequency bands of the radar sensor 122 are selectable and only non-interfering frequency bands are selected for the radar sensor 122.

In some examples, the radar sensor 122 is configured to have approximately the same coverage area as it's associated remote antenna unit 104. This can be important when controlling the operation of the remote antenna unit 104 based on the data captured by the respective radar sensor 122. For example, if the coverage area of the radar sensor 122 is larger than the coverage area of the remote antenna unit 104, then the power amplifiers of the remote antenna unit 104 may be turned on when a user is not actually present in the coverage area of the remote antenna unit 104, which degrades efficiency and mean time between failures (MTBF) of the remote antenna unit 104. Similarly, if the coverage area of the radar sensor 122 is smaller than the coverage area of the remote antenna unit 104, then the power amplifiers of the remote antenna unit 104 may not be turned on when a user is present in the coverage area and degrade the coverage experience for the user.

In some examples, the radar sensor 122 is configured to detect the presence of users 108 (for example, humans) in the vicinity of the respective radar sensor 122 based on the 3D image data. In some examples, the radar sensor 122 is configured to process the 3D image data and output processed user detection data from the radar sensor 122 rather than the raw data captured by the radar sensor 122. For example, the radar sensor 122 can be configured to process the 3D image data and output the number of users 108 in the vicinity of the radar sensor 122 in real-time. In other examples, the radar sensor 122 can be configured to output raw 3D image data to the remote antenna unit 104 and processing of the image data occurs in the remote antenna unit 104 and/or master unit 102. The distributed processing at the remote antenna units 104 is more efficient from a data communication standpoint than sending the raw 3D image data to the master unit 102 for centralized processing.

In the example shown in FIG. 1, the radar sensor 122 is communicatively coupled to the remote antenna unit 104 via an interface (for example, using a USB interface) and the remote antenna unit 104 is configured to obtain user detection data from the radar sensor 122. The radar sensor 122 and the remote antenna unit 104 can be configured to communicate using a communication protocol, which can be a proprietary protocol or a protocol known in the art. One or more components of the DAS 100 are configured to adjust the power consumption of the remote antenna unit based on the user detection data provided by the radar sensors 122 as discussed below with respect to FIGS. 3 and 5.

In some examples, the DAS 100 is configured to dynamically allocate capacity among the remote antenna units 104 based on the user detection data from the radar sensors 122. In some examples, the DAS 100 is configured to assume that each user detected in the coverage area has one mobile device. Therefore, for each user detected, the DAS 100 allocates enough capacity to that coverage area to provide capacity to the respective number of users/mobile devices. In some examples, the radar sensor 122 communicates the number of users 108 in the coverage area to the remote antenna unit 104 and the remote antenna unit 104 forwards the number of users 108 to the master unit 102. In such examples, the master unit 102, which has data from the remote antenna units 104 in the DAS 100, can dynamically route the radio frequency signals to coverage areas based on need. In some examples, the radio frequency signals to be re-routed shall be pre-defined by the system's owner. For example, a system owner/operator may define a priority scheme for when there are multiple crowded areas to be served such that the priority will be defined by the number of users 108 detected in the area: the most populated area gets more radio frequency signals routed in first. In other examples, the system's owner/operator can pre-define priority schemes that prioritize particular coverage areas based on other factors (for example, surrounding environment, time of day, etc.).

In some examples, the master unit 102 and the remote antenna units 104 are configured to communicate data related to power management or capacity allocation for the remote antenna units 104 using communication links separate from those used to communicate the wireless signals. In other examples, a portion of the bandwidth of communications over communication links 121 is utilized for communicating data related to power management or capacity allocation for the remote antenna units 104. For example, part of the communication frame can be used to create a 1 gigabit link between the master unit 102 and remote antenna units 104 using the communication links 121. The remote antenna units 104 can include a switch to add the user detection data to uplink data streams and the master unit 102 can include a switch to add control signals to the downlink data streams. It should be understood that other protocols for framing the data communicated between the master unit 102 and the remote antenna units 104 could also be used.

In some examples, the radar sensors 122 are also configured to determine the position of the detected users 108 with respect to the radar sensor 122 and output the position of the detected users 108 (for example, the coordinates (x, y, z) of the user) in real-time. In some examples, the radar sensor 122 is configured to output the position of the users 108 and a user-ID at a predetermined time interval, which can be selected by the operator of the DAS 100. In some examples, the predetermined time interval set by the system operator can be in the order of seconds.

In some examples, a component of the DAS 100 is configured to adjust the transmission power of the remote antenna unit 104 based on the number of users 108 detected by the radar sensor 122 and the distance of each user from the remote antenna unit 104. In some examples, the remote antenna unit 104 is configured to process the data from the radar sensor 122 and adjust its own transmission power based on the data from the radar sensor 122. In other examples, the remote antenna unit 104 communicates the user positions and user IDs to the master unit 102 and the master unit 102 triggers a request to the remote antenna unit 104 to adjust the radiating power levels based on the user positions in the coverage area. In some examples, the transmission power of the remote antenna unit 104 is determined based on the farthest user from the remote antenna unit 104. For example, the transmission power is adjusted to a level such that the remote antenna unit 104 can provide coverage to the user that is farthest from the remote antenna unit 104 in the coverage area of the remote antenna unit 104.

C-RAN Implementation

Figure 2:
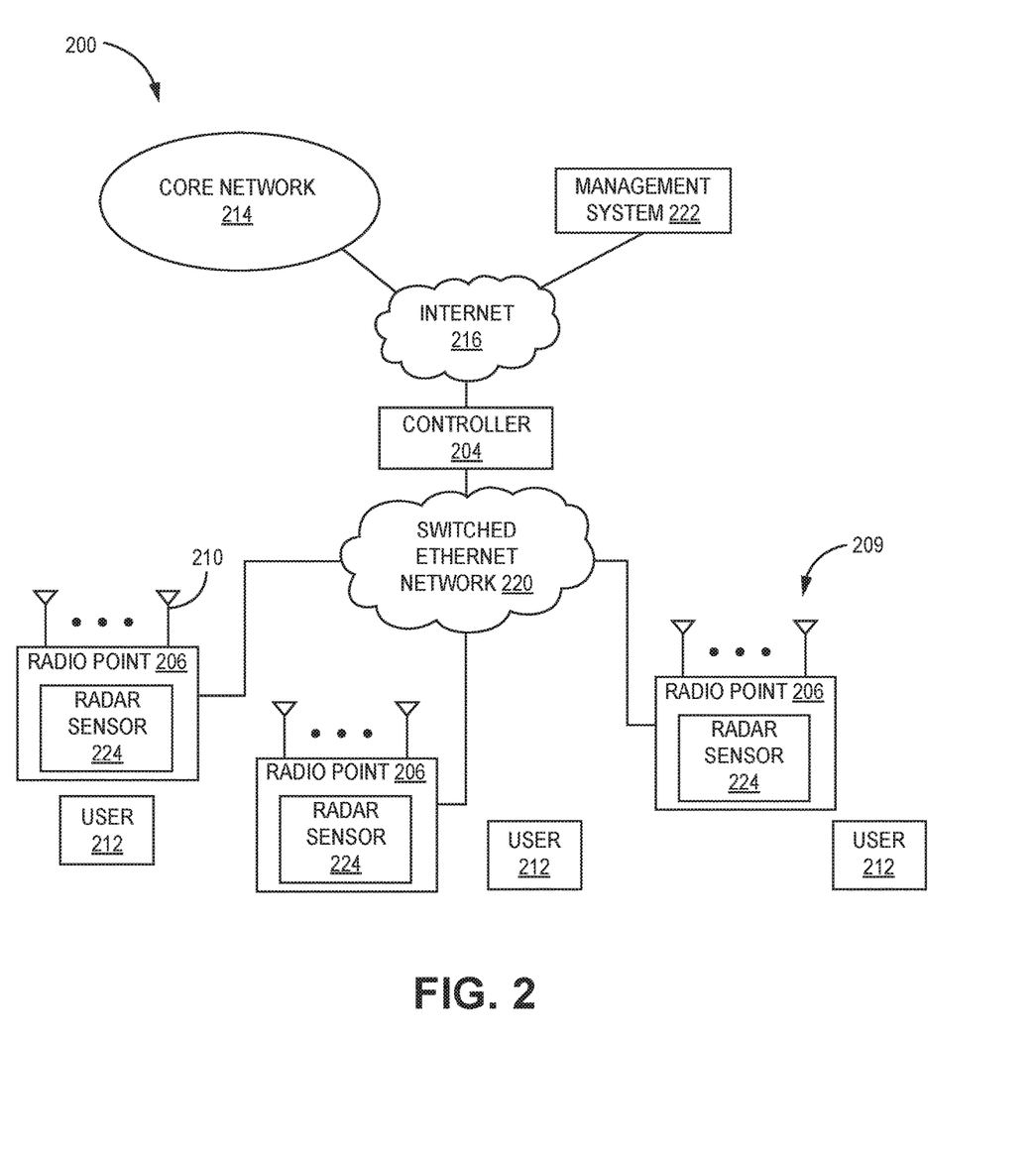
FIG. 2 is a block diagram of an example C-RAN system.

FIG. 2 is a block diagram illustrating one example of a radio access network (RAN) system 200 that can be enhanced with the user detection techniques described herein. The system 200 is deployed at a site to provide wireless coverage and capacity for one or more wireless network operators. The site may be, for example, a building or campus or other grouping of buildings (used, for example, by one or more businesses, governments, or other enterprise entities) or some other public venue (such as a hotel, resort, amusement park, hospital, shopping center, airport, university campus, arena, or an outdoor area such as a ski area, stadium or a densely-populated downtown area).

In the example shown in FIG. 2, the system 200 is implemented at least in part using a C-RAN architecture that employs at least one baseband unit 204 and multiple radio points 206. The system 200 is also referred to herein as a "C-RAN system" 200. Each radio point 206 is remotely located from the baseband unit 204. Also, in this example, at least one of the radio points 206 is remotely located from at least one other radio point 206. The baseband units 204 are also referred to herein as "baseband controllers" 204 or just "controllers" 204.

Each radio point 206 includes or is coupled to an antenna array 209 comprising multiple antennas 210 via which downlink RF signals are radiated to user equipment (UE) and via which uplink RF signals transmitted by UEs are received. Various numbers of antennas 210 can be used (for example, thirty-two antennas 210). The radio points 206 are also referred to as "radiating points" or "access points."

The system 200 is coupled to the core network 214 of each wireless network operator over an appropriate back-haul. In the example shown in FIG. 2, the Internet 216 is used for back-haul between the system 200 and each core network 214. However, it is to be understood that the back-haul can be implemented in other ways.

The example of the system 200 shown in FIG. 2 is suitable for use any air interface (including, for example and without limitation, Long Term Evolution (LTE) and the Fifth Generation (5G) air interfaces).

In this example, the controller 204 and radio points 206 together are used to implement an Evolved Node B (also referred to herein as an "eNodeB" or "eNB") that is used to provide user equipment with mobile access to the wireless network operator's core network 214 to enable the user equipment to wirelessly communicate data and voice. This eNodeB can be a macro eNodeB or a home eNodeB (HeNB).

The controllers 204 and the radio points 206 can be implemented so as to use an air interface that supports one or more of frequency-division duplexing (FDD) and/or time-division duplexing (TDD). Moreover, the controllers 204 and/or the radio points 206 can be configured to support multiple air interfaces and/or to support multiple wireless operators.

Each controller 204 is communicatively coupled to the radio points 206 using a front-haul network 218. In the example shown in FIG. 2, the front-haul 218 that communicatively couples each controller 204 to one or more radio points 206 is implemented using a standard switched Ethernet network 220. However, it is to be understood that the front-haul between the controllers 204 and radio points 206 can be implemented in other ways.

The switched Ethernet network 220 comprises one or more Ethernet switches. Each controller 204 is communicatively coupled to one or more of the switches in the Ethernet network 220 via a respective one or more Ethernet links (only one of which is shown for ease of illustration). Each radio point 206 is communicatively coupled to one or more of the switches in the Ethernet network 220 via a respective one or more Ethernet links (only one of which is shown for ease of illustration).

Generally, one or more nodes in a C-RAN system perform analog radio frequency (RF) functions for the air interface as well as digital Layer 1, Layer 2, and Layer 3 (of the Open Systems Interconnection (OSI) model) functions for the air interface.

In the example shown in FIG. 2, each baseband controller 204 comprises Layer-1 (L1) functionality, Layer-2 (L2) functionality, and Layer-3 (L3) functionality configured to perform at least some of the Layer-1 processing, Layer-2 processing, and Layer-3 processing, respectively, for the air interface implemented by the C-RAN system 200. Each radio point 206 includes Layer-1 functionality that implements any Layer-1 processing for the air interface that is not performed in the controllers 204 and one or more radio frequency (RF) circuits (not shown) that implement the RF front-end functions for the air interface and the one or more antennas 210 associated with that radio point 206.

Different splits in the air-interface processing between the controller 204 and the radio points 206 can be used. In one example, each baseband controller 204 can be configured to perform all of the digital Layer-1, Layer-2, and Layer-3 processing for the air interface, while the radio points 206 (specifically, the RF circuits) implement only the RF functions for the air interface and the antennas 208 associated with each radio point 206. In that case, in-phase and quadrature (IQ) data representing time-domain symbols for each antenna is communicated between the controller 204 and the radio points 206. Other splits can be used and data can be communicated between the controllers 204 and the radio points 206 in other formats. In the following description, the fronthaul data communicated between the controllers 204 and the radio points 206 for the air interface is generally referred to as "IQ data" even though such fronthaul data can take many forms, including forms that are not IQ data.

Also, the form in which IQ data is communicated in the downlink direction (that is, the direction from the controller 204 to the radio points 206) can differ from the form in which IQ data is communicated in the uplink direction (that is, the direction from the radio points 206 to the controller 204). Also, for a given direction (downlink or uplink), not all fronthaul data needs to be communicated in the same form (that is, the fronthaul data for different channels or for different resource blocks can be communicated in different ways).

Data can be front-hauled between the controllers 204 and radio points 206 in other ways.

Each controller 204 and radio point 206 (and the functionality described as being included therein), as well as the system 200 more generally, and any of the specific features described here as being implemented by any of the foregoing, can be implemented in hardware, software, or combinations of hardware and software, and the various implementations (whether hardware, software, or combinations of hardware and software) can also be referred to generally as "circuitry" or a "circuit" configured to implement at least some of the associated functionality. When implemented in software, such software can be implemented in software or firmware executing on one or more suitable programmable processors. Such hardware or software (or portions thereof) can be implemented in other ways (for example, in a field programmable gate array (FPGA), application specific integrated circuit (ASIC), etc.). Also, the RF functionality can be implemented using one or more RF integrated circuits (RFICs) and/or discrete components. Each controller 204 and radio point 206, and the system 200 more generally, can be implemented in other ways.

In the example shown in FIG. 2, a management system 222 is communicatively coupled to the controllers 204 and radio points 206, for example, via the Internet 216 and Ethernet network 220 (in the case of the radio points 206).

In the example shown in FIG. 2, the management system 222 communicates with the various elements of the system 200 using the Internet 216 and the Ethernet network 220. Also, in some implementations, the management system 222 sends and receives management communications to and from the controllers 204, each of which in turn forwards relevant management communications to and from the radio points 206. The management system 222 can comprise a proprietary management system provided by the vendor of the C-RAN system 200 or a Home eNodeB management system (HeNB MS) (or other eNodeB management system) used by an operator to manage Home eNodeBs (or other eNodeBs) deployed in its network.

Each controller 204 can also implement a management interface by which a user is able to directly interact with the controller 204. This management interface can be implemented in various ways including, for example, by implementing a web server that serves web pages that implement a web-based graphical user interface for a user to interact with the controller 204 using a web browser and/or by implementing a command-line interface by which a user is able to interact with the controller 204, for example, using secure shell (SSH) software.

In the example shown in FIG. 2, the C-RAN system 200 further includes radar sensors 224 in the radio points 206 to provide real-time user detection data, which can include the number of users and the location of the users 212 in the coverage area of the radio points 206. The radar sensors 224 are configured to operate in a similar manner to the radar sensors 122 described above with respect to FIG. 1. The C-RAN system 200 is configured to adjust the power consumption of the radio points 206 and/or allocate capacity to the radio points 206 based on the user detection data. In some examples, one or more components of the C-RAN system 200 are configured to adjust power consumption by activating or deactivating power amplifiers of the radio points 206 based on the user detection data. In some examples, Internet of Things (IoT) bands and digital/RF components in the radio points 206 that require long power cycle time remain active, which can be advantageous in order to quickly react to the presence requirements. In some examples, one or more components of the C-RAN system 200 are further configured to adjust power consumption by adjusting the speed of internal fans of the radio points 206 and/or the transmission power level of the radio points 206. In some examples, the controller 204 includes a database to store the user detection data, which can be accessed by emergency crews or by the system operator for other purposes than power management or capacity allocation.

The radar sensor 224 can be integrated with the radio point 206, which could include, for example, mounting the radar sensor 224 inside the housing of the radio point 206. In other examples, the radar sensor 224 is mounted near the radio point 206. It should be understood that the C-RAN system 200 can include a subset of radio points 206 with an integrated radar sensor 224 and another subset of radio points 206 where the radar sensor 224 is mounted near the respective radio points 206. The radar sensor 224 can be powered internally or externally by the radio point 206 or another source of power.

In some examples, the radar sensor 224 is configured to have approximately the same coverage area as it's associated radio point 206. This can be important when controlling the operation of the radio point 206 based on the data captured by the respective radar sensor 224. For example, if the coverage area of the radar sensor 224 is larger than the coverage area of the radio point 206, then the power amplifiers of the radio point 206 may be turned on when a user is not actually present in the coverage area of the radio point 206, which degrades efficiency and mean time between failures (MTBF) of the radio point 206. Similarly, if the coverage area of the radar sensor 224 is smaller than the coverage area of the radio point 206, then the power amplifiers of the radio point 206 may not be turned on when a user is present in the coverage area and degrade the coverage experience for the user.

Similar to the radar sensors 122 described above with respect to FIG. 1, in some examples, the radar sensor 224 is configured to detect the presence of users (for example, humans) in the vicinity of the respective radar sensor 224 based on captured 3D image data. In some examples, the radar sensor 224 is configured to process the 3D image data and output processed user detection data from the radar sensor 224 rather than the raw data captured by the radar sensor 224. For example, the radar sensor 224 can be configured to process the 3D image data and output the number of users in the vicinity of the radar sensor 224 in real-time. In other examples, the radar sensor 224 can be configured to output raw 3D image data to the radio point 206 and processing of the image data occurs in the radio point 206 and/or controller 204. The distributed processing at the radio points 206 is more efficient from a data communication standpoint than sending the raw 3D image data to the controller 204 for centralized processing.

In the example shown in FIG. 2, the radar sensor 224 is communicatively coupled to the radio point 206 via an interface (for example, using a USB interface) and the radio point 206 is configured to obtain user detection data from the radar sensor 224. The radar sensor 224 and the radio point 206 can be configured to communicate using a communication protocol, which can be a proprietary protocol or a protocol known in the art. One or more components of the C-RAN system 200 are configured to adjust the power consumption of the radio points 206 based on the user detection data provided by the radar sensors in a similar manner as discussed above with respect to FIG. 1 and below with respect to FIGS. 3 and 5.

In some examples, the C-RAN system 200 is configured to dynamically allocate capacity among the radio points 206 based on the user detection data from the radar sensors 224. In some examples, the C-RAN system 200 is configured to assume that each user detected in the coverage area has one mobile device. Therefore, for each user detected, the C-RAN system 200 allocates enough capacity to that coverage area to provide capacity to the respective number of users/mobile devices. In some examples, the radar sensor 224 communicates the number of users 212 in the coverage area to the radio point 206 and the radio point 206 forwards the number of users 212 to the controller 204. In such examples, the controller 204, which has data from the radio points 206 in the C-RAN system 200, can dynamically route the radio frequency signals to coverage areas based on need. In some examples, the radio frequency signals to be re-routed shall be pre-defined by the system's owner. For example, a system owner/operator may define a priority scheme for when there are multiple crowded areas to be served such that the priority will be defined by the number of users 212 detected in the area: the most populated area gets more radio frequency signals routed in first. In other examples, the system's owner/operator can pre-define priority schemes that prioritize particular coverage areas based on other factors (for example, surrounding environment, time of day, etc.).

In some examples, the controller 204 and the radio points 206 are configured to communicate data related to power management or capacity allocation for the radio points 206 using communication links separate from those used to communicate the wireless signals. In other examples, a portion of the bandwidth of communications over switched Ethernet network 220 is utilized for communicating data related to power management or capacity allocation for the radio points 206. For example, part of the communication frame can be used to create a 1 gigabit link between the controller 204 and radio points 206 using the switched Ethernet network 220. The radio points 206 can include a switch to add the user detection data to uplink data streams and the controller 204 can include a switch to add control signals to the downlink data streams. It should be understood that other protocols for framing the data communicated between the controller 204 and the radio points 206 could also be used.

In some examples, the radar sensors 224 are also configured to determine the position of the detected users 212 with respect to the radar sensor 224 and output the location of the detected users 212 (for example, the users' coordinates (x, y, z)) in real-time. In some examples, the radar sensor 224 is configured to output the position of the users 212 and a user-ID at a predetermined time interval, which can be selected by the operator of the C-RAN system 200. In some examples, the predetermined time interval set by the system operator can be in the order of seconds.

In some examples, a component of the C-RAN system 200 is configured to adjust the transmission power of the radio point 206 based on the number of users 212 detected by the radar sensor 224 and the distance of each user from the radio point 206. In some examples, the radio point 206 is configured to process the data from the radar sensor 224 and adjust its own transmission power based on the data from the radar sensor 224. In other examples, the radio point 206 communicates the user positions and user IDs to the controller 204 and the controller 204 triggers a request to the radio point 206 to adjust the radiating power levels based on the user positions in the coverage area. In some examples, the transmission power of the radio point 206 is determined based on the farthest user from the radio point 206. For example, the transmission power is adjusted to a level such that the radio point 206 can provide coverage to the user that is farthest from the radio point 206 in the coverage area of the radio point 206.

Figure 3:
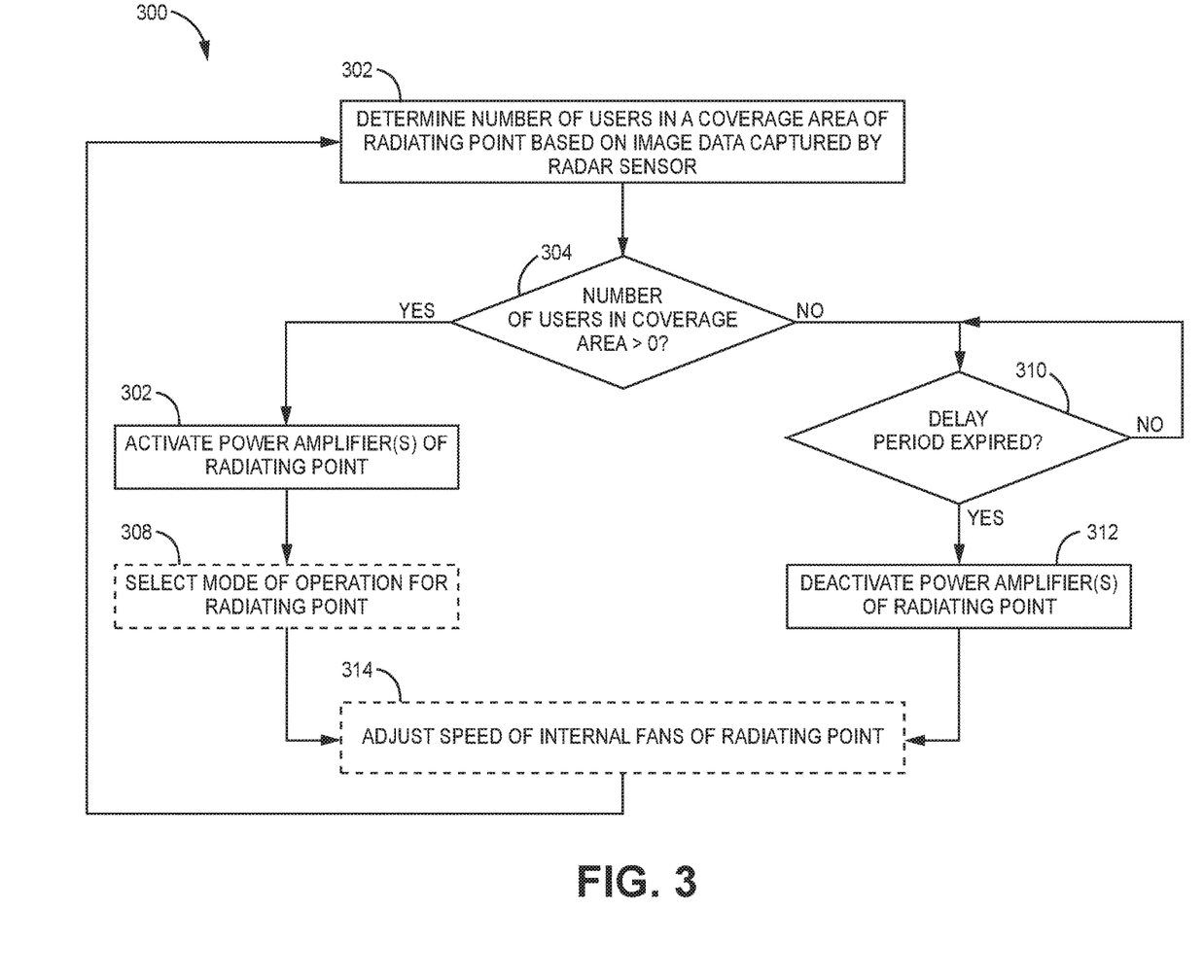
FIG. 3 is a flow diagram of an example method of power management for a radiating point.

FIG. 3 is a flow diagram of an example method 300 of power management for a radiating point. The common features discussed above with respect to DAS 100 and C-RAN system 200 in FIGS. 1-2 can include similar characteristics to those discussed with respect to method 300 and vice versa. In some examples, method 300 can be performed in a distributed manner at the radiating points (for example, remote antenna units 104 or radio points 206) or in a more centralized manner where one or more functions are performed by a central unit (for example, master unit 102 or controller 204).

Method 300 includes determining the number of users in a coverage area of a radiating point based on image data captured by a radar sensor (block 302). In some examples, the radar sensor includes a digital signal processor configured to process the image data and output a number of users in the coverage area. In other examples, the radar sensor provides the captured image data to the radiating point, which either determines the number of users in the coverage area itself or provides the image data to the central unit for this determination.

Method 300 further includes determining whether the number of users in the coverage area of the radiating point is greater than zero (block 304). In some examples, the radiating point or the central unit of the DAS determines whether any users were detected in the coverage.

When the number of users in the coverage area of the radiating point is greater than zero, the method 300 proceeds with activating one or more power amplifiers of the radiating point (block 306). In some examples, all of the power amplifiers of the radiating point are activated if a single user is in the coverage area of the radiating point. In other examples, fewer than all of the power amplifiers of the radiating point are activated in a manner that is selectable by the system operator. The number of power amplifiers that are activated can be determined based on the number of users in the coverage area of the radiating point. For example, thresholds can be predetermined for a particular number of users and power amplifiers based on coverage and capacity requirements for particular numbers of users.

Method 300 optionally includes selecting a mode of operation for the radiating point (block 308). In some examples, the central unit determines whether to use a single-input-single-output (SISO) or multiple-input-multiple-output (MIMO) communications mode based on the number of users in the coverage area and the amount of capacity allocated to the coverage area. For example, if sufficient capacity is available to communicate with a mobile device of all users in the coverage area using multiple channels, then the central unit can select to operate using MIMO to increase data throughput.

When the number of users in the coverage area of the radiating point is not greater than zero, method 300 includes determining whether a delay period has expired (block 310). In some examples, the delay period is determined by the owner/operator of the system and can be on the order of seconds to minutes. It can be advantageous to include the delay period for areas of high traffic to avoid degraded coverage when the number of users is changing rapidly.

When the delay period has passed, method 300 proceeds with deactivating the power amplifiers of the radiating point (block 312).

Method 300 optionally includes adjusting a speed of internal fans of the radiating point (block 314). In some examples, the speed of the internals fans is adjusted based on the number of active power amplifiers in the radiating point. For example, if no power amplifiers in the radiating point are active, then the speed of the internal fans is reduced to a level such that cooling can still be provided for the other active components. Similarly, if one or more power amplifiers are activated, the speed of the internal fans is increased such that sufficient cooling is provided for the heat generated by the activated power amplifiers.

Figure 4:
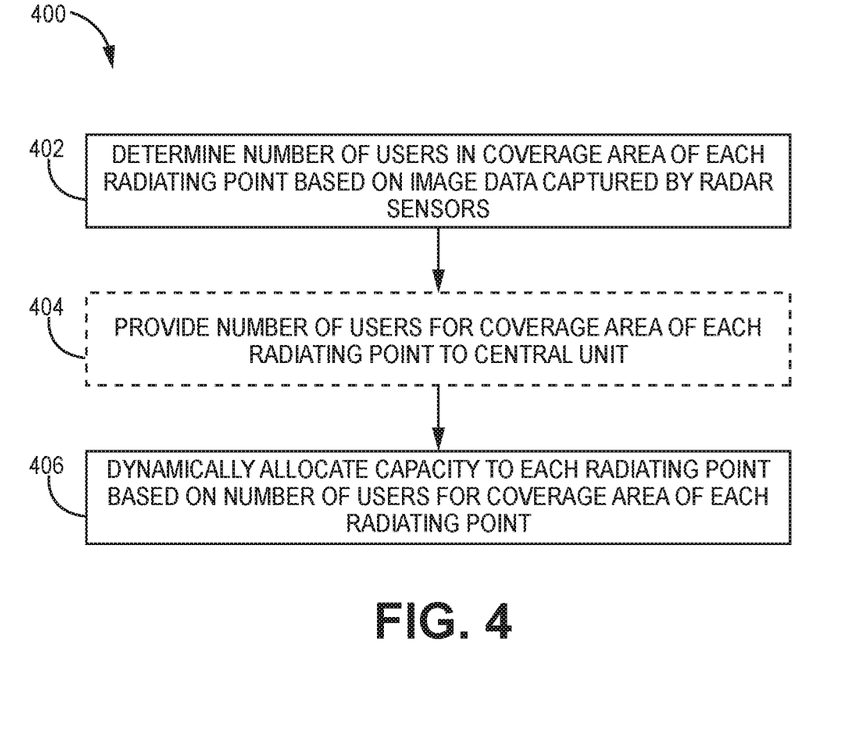
FIG. 4 is a flow diagram of an example method of capacity allocation for a radiating point.

FIG. 4 is a flow diagram of an example method 400 of capacity allocation for a radiating point. The common features discussed above with respect to DAS 100 and C-RAN system 200 in FIGS. 1-3 can include similar characteristics to those discussed with respect to method 400 and vice versa.

Method 400 includes determining the number of users in respective coverage areas of each radiating point of a DAS based on image data captured by radar sensors (block 402). In some examples, the radar sensor includes a digital signal processor configured to process the image data and output a number of users in the coverage area. In other examples, the radar sensor provides the captured image data to the radiating point, which either determines the number of users in the coverage area itself or provides the image data to the central unit for this determination.

In some examples, method 400 further includes providing the number of users in the coverage area for each radiating point of the system to the central unit (block 404). In some examples, each respective radiating point provides the number of users in the coverage area for the respective radiating point to the central unit. In examples where the central unit receives the image data from the radiating points rather than the number of users, block 404 is omitted as the central unit determines the number of users.

Method 400 further includes dynamically allocating capacity to each radiating point based on the number of users in each coverage area (block 406). In some examples, the system assumes that each user detected in the coverage area has one mobile device and allocates sufficient capacity to that coverage area to provide capacity to the respective number of users/mobile devices. The central unit dynamically routes the radio frequency signals to coverage areas based on the number of users and can route the radio frequency signals based on pre-defined priority schemes. For example, a system owner/operator may define a priority scheme for when there are multiple crowded areas to be served such that the priority will be defined by the number of users detected in the area: the most populated area gets more radio frequency signals routed in first. In other examples, the owner/operator of the system can pre-define priority schemes that prioritize particular coverage areas based on other factors (for example, surrounding environment, time of day, etc.).

Figure 5:
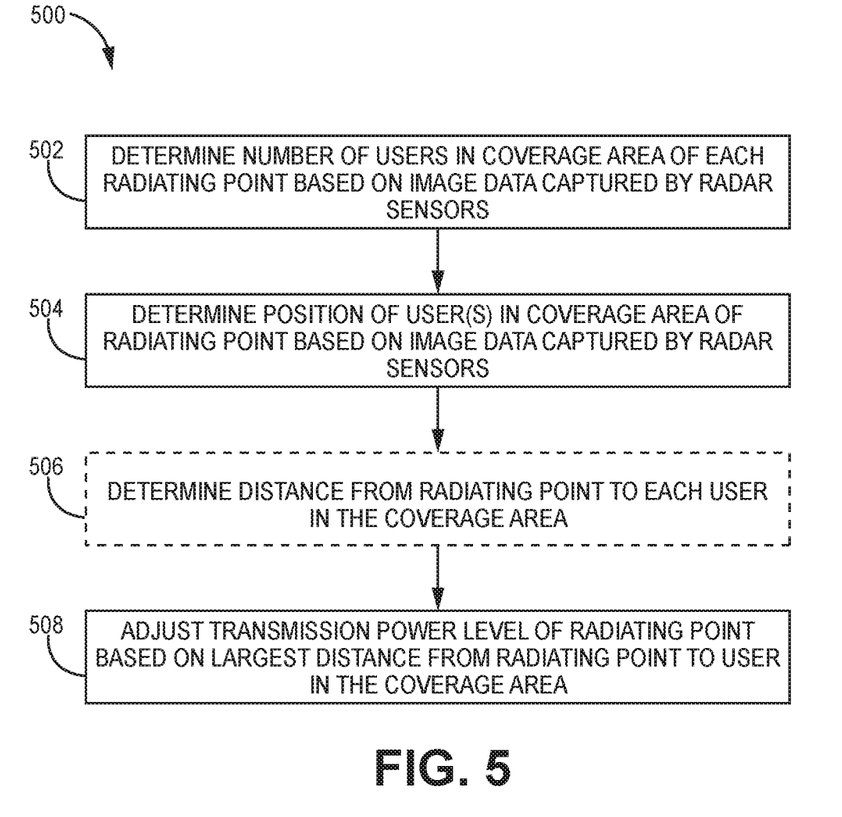
FIG. 5 is a flow diagram of an example method of power management for a radiating point.

FIG. 5 is a flow diagram of an example method 500 of power management for a radiating point. The common features discussed above with respect to DAS 100 and C-RAN system 200 in FIGS. 1-4 can include similar characteristics to those discussed with respect to method 500 and vice versa.

Method 500 includes determining the number of users in respective coverage areas of each radiating point of a DAS based on image data captured by radar sensors (block 502).

In some examples, the radar sensor includes a digital signal processor configured to process the image data and output a number of users in the coverage area. In other examples, the radar sensor provides the captured image data to the radiating point, which either determines the number of users in the coverage area itself or provides the image data to the central unit for this determination.

Method 500 includes determining the position of users in a coverage area of a radiating point based on image data captured by a radar sensor (block 504). In some examples, the radar sensors determine the position of the detected users with respect to the radar sensor and output the position of the detected users (for example, the users' coordinates (x, y, z) with respect to the radar sensor) in real-time. In some examples, the radar sensors output the position of the users and a user-ID at a predetermined time interval, which can be selected by the operator of the system. In some examples, the predetermined time interval set by the system operator can be in the order of seconds. In other examples, the radiating point or the central unit can perform this determination based on the 3D image data captured by the radar sensor.

Method 500 proceeds with determining a distance between each detected user in the coverage area and the radiating point (block 506). The radiating points are fixed during operation of the system, so the position of the radiating point is known. The distance between users and the radiating point can be determined by taking the square root of the sum of the squares of the difference between the coordinates of a user and the coordinates of the radiating point. In some examples, the radiating point can be set to have the coordinates (0, 0, 0) and the distance between users and the radiating point can be determined by taking the square root of the sum of the squares of coordinates of the user. This determination can be performed by the radar sensor, radiating point, or the central unit depending on which component of the system performs the other determinations of method 500.

Method 500 proceeds with adjusting the transmission power level of the radiating point based on the largest distance between a detected user and the radiating point (block 508). In some examples, the radiating point autonomously adjusts its own transmission power based on the data from the radar sensor. In other examples, the radiating point communicates the user positions and user IDs to the central unit and the central unit triggers a request to the radiating point to adjust the radiating power levels based on the distance between users in the coverage area and the radiating point. In some examples, the transmission power level of the radiating point is determined based on the farthest user from the radiating point. For example, the transmission power is adjusted to a level such that the radiating point can provide coverage to the user that is farthest from the radiating point in the coverage area of the radiating point.

The examples described herein provide systems and methods that enhance performance of a DAS or C-RAN system. By dynamically managing power consumption of the radiating points, the systems and methods described above reduce operational expenditure for operating the radiating points and simultaneously enhances the mean time between failure since the overall power consumption of the radiating points is decreased. Further, by dynamically allocating capacity in real-time, the capital expenditures for a DAS or C-RAN system can be reduced because fewer base stations are needed to provide service throughout the coverage zones.

For both the DAS and C-RAN system implementations, using a radar sensor enables gathering the information regarding the users in the coverage area without violating user privacy, which would be the case if pictures were taken using a camera or phone activity was monitored to determine the number of users in a coverage area. Further, using a radar sensor enables advanced functionality of the DAS or C-RAN for safety applications compared to using cameras. In particular, the radar sensor is able to detect and locate users in the dark or with smoke present, so emergency crews can access information from the DAS or C-RAN regarding the number of users in building and the position of the users in the building in emergency situations.

In some examples, the DAS or C-RAN system can generate a static or dynamic map of the environment and the users based on collaborations between neighboring radiating points. For example, the system operator can access user detection data centrally stored and use the data to generate a map showing the location of users, radiating points, and/or central units distributed throughout the site serviced by the DAS or C-RAN system.

In various aspects, system elements, method steps, or examples described throughout this disclosure (such as the radiating points, central units, or components thereof, for example) may be implemented on one or more computer systems, field programmable gate array (FPGA), application specific integrated circuit (ASIC) or similar devices comprising hardware executing code to realize those elements, processes, or examples, said code stored on a non-transient data storage device. These devices include or function with software programs, firmware, or other computer readable instructions for carrying out various methods, process tasks, calculations, and control functions, used for synchronization and fault management in a distributed antenna system.

These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAIVIBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random-access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

EXAMPLE EMBODIMENTS

Example 1 includes a system, comprising: a central unit; a radiating point located remotely from the central unit and communicatively coupled to the central unit, wherein the radiating point is configured to provide radio frequency signals to a coverage zone via one or more antennas; a radar sensor communicatively coupled to the radiating point and configured to capture image data in the coverage zone of the radiating point, wherein the radar sensor includes a plurality of transmitters and receivers coupled to an antenna array; wherein one or more components of the system are configured to: determine user detection data for users in the coverage zone based on the image data captured by the radar sensor; and adjust the power consumption of the radiating point based on the user detection data.

Example 2 includes the system of Example 1, wherein the radiating point is configured to autonomously adjust the power consumption of the radiating point based on the user detection data.

Example 3 includes the system of any of Examples 1-2, wherein the central unit is configured to receive the image data or the user detection data from the radiating point and provide a control signal to the radiating point to adjust the power consumption of the radiating point.

Example 4 includes the system of any of Examples 1-3, wherein the one or more components of the system are configured to adjust the power consumption of the radiating point by activating or deactivating at least one power amplifier of the radiating point.

Example 5 includes the system of Example 4, wherein the one or more components of the system are further configured to modify a speed of internal fans of the radiating point based on a number of active power amplifiers of the radiating point.

Example 6 includes the system of any of Examples 1-5, wherein the radar sensor is configured to have approximately the same coverage area as the radiating point.

Example 7 includes the system of any of Examples 1-6, wherein the radar sensor is configured to operate in a non-interfering frequency range compared to an operating frequency range of the radiating point.

Example 8 includes the system of Example 7, wherein the operating frequency range of the radiating point is approximately between 380 MHz and 3.8 GHz.

Example 9 includes the system of any of Examples 1-8, wherein the user detection data includes a location of each detected user in the coverage area of the radiating point.

Example 10 includes the system of Example 9, wherein the system is configured to modify the transmission power of the radiating point based on the location of the detected users in the coverage area of the radiating point.

Example 11 includes the system of any of Examples 1-10, wherein the central unit is further configured to dynamically allocate capacity to the radiating point based on the user detection data and other user detection data derived from image data captured by other radar sensors in coverage areas of different radiating points of the system.

Example 12 includes the system of Example 11, wherein the central unit is configured to prioritize distributing capacity to the radiating point when the user detection data indicates that the number of users in the coverage zone of the radiating point is higher than a number of users in a second coverage zone.

Example 13 includes the system of any of Examples 1-12, wherein the radar sensor is integrated into a housing of the radiating point.

Example 14 includes the system of any of Examples 1-13, wherein the radar sensor is mounted near the radiating point and communicatively coupled to the radiating point.

Example 15 includes the system of any of Examples 1-14, wherein the system comprises a distributed antenna system, wherein the central unit is a master unit, wherein the radiating point is a remote antenna unit.

Example 16 includes the system of any of Examples 1-15, wherein the system comprises a cloud radio access network system, wherein the central unit is a controller, wherein the radiating point is a radio point.

Example 17 includes a method, comprising: determining a number of users in a coverage area of a radiating point of a system based on image data captured by a radar sensor, wherein the radiating point is located remotely from a central unit of the system and communicatively coupled to the central unit, wherein the radiating point is configured to provide radio frequency signals to a coverage zone via one or more antennas, wherein the radar sensor includes a plurality of transmitters and receivers coupled to an antenna array; and adjusting power consumption of the radiating point based on the number of users in the coverage area of the radiating point.

Example 18 includes the method of Example 17, wherein adjusting power consumption of the radiating point based on the number of users in the coverage area of the radiating point comprises at least one of: activating at least one power amplifier of the radiating point when a user is in the coverage area of the radiating point; deactivating the power amplifiers of the radiating point when no users are present in the coverage area of the radiating point; and adjusting a speed of internal fans of the radiating point based on a number of power amplifiers of the radiating point that are activated.

Example 19 includes the method of any of Example 18, further comprising waiting a predetermined delay period prior to deactivating the power amplifiers of the radiating point when no users are present in the coverage area of the radiating point.

Example 20 includes the method of any of Examples 17-19, further comprising dynamically allocating capacity to the radiating point based on the number of users in the coverage area of the radiating point.

Example 21 includes the method of any of Examples 17-20, further comprising: determining a position of detected users in the coverage area of the radiating point based on the image data captured by the radar sensor; determining a distance between the detected users in the coverage area and the radiating point; and adjusting power consumption of the radiating point based on a largest distance between a detected user and the radiating point.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A system, comprising:
 a central unit;
 a radiating point located remotely from the central unit and communicatively coupled to the central unit, wherein the radiating point is configured to provide radio frequency signals to a coverage zone via one or more antennas, wherein an operating frequency range of the radiating point is approximately between 380 MHz and 3.8 GHz;
 a radar sensor communicatively coupled to the radiating point and configured to capture image data in the coverage zone of the radiating point, wherein the radar sensor includes a plurality of transmitters and receivers coupled to an antenna array, wherein the radar sensor is configured to operate in a non-interfering frequency range compared to the operating frequency range of the radiating point;
 wherein one or more components of the system are configured to:
  determine user detection data for users in the coverage zone based on the image data captured by the radar sensor; and
  adjust power consumption of the radiating point based on the user detection data.

2. The system of claim 1, wherein the radiating point is configured to autonomously adjust the power consumption of the radiating point based on the user detection data.

3. The system of claim 1, wherein the central unit is configured to receive the image data or the user detection data from the radiating point and provide a control signal to the radiating point to adjust the power consumption of the radiating point.

4. The system of claim 1, wherein the one or more components of the system are configured to adjust the power consumption of the radiating point by activating or deactivating at least one power amplifier of the radiating point.

5. The system of claim 4, wherein the one or more components of the system are further configured to modify a speed of internal fans of the radiating point based on a number of active power amplifiers of the radiating point.

6. The system of claim 1, wherein the radar sensor is configured to have approximately the same coverage area as the radiating point.

7. The system of claim 1, wherein the user detection data includes a location of each detected user in the coverage zone of the radiating point.

8. The system of claim 7, wherein the system is configured to modify a transmission power of the radiating point based on the location of the detected users in the coverage zone of the radiating point.

9. The system of claim 1, wherein the central unit is further configured to dynamically allocate capacity to the radiating point based on the user detection data and other user detection data derived from image data captured by other radar sensors in coverage zones of different radiating points of the system.

10. The system of claim 9, wherein the central unit is configured to prioritize distributing capacity to the radiating point when the user detection data indicates that a number of users in the coverage zone of the radiating point is higher than a number of users in a second coverage zone.

11. The system of claim 1, wherein the radar sensor is integrated into a housing of the radiating point.

12. The system of claim 1, wherein the radar sensor is mounted near the radiating point and communicatively coupled to the radiating point.

13. The system of claim 1, wherein the system comprises a distributed antenna system, wherein the central unit is a master unit, wherein the radiating point is a remote antenna unit.

14. The system of claim 1, wherein the system comprises a cloud radio access network system, wherein the central unit is a controller, wherein the radiating point is a radio point.

15. A method, comprising:
 determining a number of users in a coverage area of a radiating point of a system based on image data captured by a radar sensor, wherein the radiating point is located remotely from a central unit of the system and communicatively coupled to the central unit, wherein the radiating point is configured to provide radio frequency signals to a coverage zone via one or more antennas, wherein an operating frequency range of the radiating point is approximately between 380 MHz and 3.8 GHz, wherein the radar sensor includes a plurality of transmitters and receivers coupled to an antenna array, wherein the radar sensor is configured to operate in a non-interfering frequency range compared to the operating frequency range of the radiating point; and
 adjusting power consumption of the radiating point based on the number of users in the coverage area of the radiating point.

16. The method of claim 15, wherein adjusting power consumption of the radiating point based on the number of users in the coverage area of the radiating point comprises at least one of:
 activating at least one power amplifier of the radiating point when a user is in the coverage area of the radiating point;
 deactivating the power amplifiers of the radiating point when no users are present in the coverage area of the radiating point; and
 adjusting a speed of internal fans of the radiating point based on a number of power amplifiers of the radiating point that are activated.

17. The method of claim 16, further comprising waiting a predetermined delay period prior to deactivating the power amplifiers of the radiating point when no users are present in the coverage area of the radiating point.

18. The method of claim 15, further comprising dynamically allocating capacity to the radiating point based on the number of users in the coverage area of the radiating point.

19. The method of claim 15, further comprising:
 determining a position of detected users in the coverage area of the radiating point based on the image data captured by the radar sensor;
 determining a distance between the detected users in the coverage area and the radiating point; and
 adjusting power consumption of the radiating point based on a largest distance between a detected user and the radiating point.

* * * * *